(12) United States Patent
Gaensler et al.

(10) Patent No.: US 8,720,199 B2
(45) Date of Patent: May 13, 2014

(54) HEAT EXCHANGER, EXHAUST GAS RECIRCULATION SYSTEM, CHARGE AIR SUPPLY SYSTEM, AND USE OF THE HEAT EXCHANGER

(75) Inventors: Michael Gaensler, Esslingen (DE); Igor Gruden, Ditzingen (DE); Heiko Wader, Nentershausen (DE); Wolfgang Weller, Winnenden (DE); Goetz Von Esebeck, Tokyo (JP); Dennie Danielsson, Royal Oak, MI (US); Stefan Neher, Stuttgart (DE); Claudia Lang, Abstatt (DE); Reinhard Blanke, Stuttgart (DE)

(73) Assignee: Behr GmbH & Co. KG, Stuttgart (DE)

( * ) Notice: Subject to any disclaimer, the term of this patent is extended or adjusted under 35 U.S.C. 154(b) by 1233 days.

(21) Appl. No.: 12/548,903

(22) Filed: Aug. 27, 2009

(65) Prior Publication Data

US 2010/0071871 A1 Mar. 25, 2010

Related U.S. Application Data

(63) Continuation of application No. PCT/EP2008/001531, filed on Feb. 27, 2008.

(30) Foreign Application Priority Data

Feb. 28, 2007 (DE) .......................... 10 2007 010 134

(51) Int. Cl.
| F28D 7/12 | (2006.01) |
| F28D 7/10 | (2006.01) |
| F28F 9/02 | (2006.01) |
| B23K 31/02 | (2006.01) |
| B23P 15/26 | (2006.01) |

(52) U.S. Cl.
USPC ............ 60/599; 165/157; 165/158; 165/164; 29/890.054

(58) Field of Classification Search
USPC ................. 60/599; 165/157, 158, 109.1, 164; 29/890.054
See application file for complete search history.

(56) References Cited

U.S. PATENT DOCUMENTS

| 6,811,756 B2 | 11/2004 | Atkinson |
| 7,168,419 B2 | 1/2007 | Rosin et al. |

(Continued)

FOREIGN PATENT DOCUMENTS

| DE | 199 07 163 A1 | 10/1999 |
| DE | 199 27 607 A1 | 12/2000 |

(Continued)

Primary Examiner — Mary A Davis
(74) Attorney, Agent, or Firm — Muncy, Geissler, Olds & Lowe, P.C.

(57) ABSTRACT

A heat exchanger for heat exchange between a first fluid and a second fluid is provided that includes: a block for guiding the first fluid and the second fluid separately and in a heat-exchanging manner, and a fluid connection for the first fluid. The block comprises a housing provided with a chamber through which the second fluid can flow, and a block end element for the fluid-tight separation of the chamber and the fluid connection. The housing can be provided for connecting the block to the fluid connection. The block end element is not used to connect the block to the fluid connection but rather preferably only the housing. The housing can be thickened accordingly in the region of the block connection. The fixing point for the block end element to the housing and the fixing point for the fluid connection to the housing are at a distance from each other.

27 Claims, 8 Drawing Sheets

(56) References Cited

U.S. PATENT DOCUMENTS

| | | |
|---|---|---|
| 7,571,718 B2 | 8/2009 | Hendrix et al. |
| 7,886,810 B2 | 2/2011 | Angermann |
| 2005/0263272 A1 | 12/2005 | Brunner et al. |
| 2006/0021344 A1* | 2/2006 | Barba et al. ............ 60/599 |
| 2006/0048926 A1 | 3/2006 | Richter |
| 2006/0201653 A1 | 9/2006 | Birkert et al. |
| 2006/0207245 A1 | 9/2006 | Yamaguchi et al. |
| 2006/0219394 A1 | 10/2006 | Martin et al. |
| 2007/0017661 A1 | 1/2007 | Geskes et al. |

FOREIGN PATENT DOCUMENTS

| | | |
|---|---|---|
| DE | 102 04 107 A1 | 9/2003 |
| DE | 10 2006 009 948 A1 | 10/2006 |
| EP | 0865838 | 9/1998 |
| JP | 9310996 A | 2/1997 |
| JP | 10-263734 | 10/1998 |
| JP | 11351074 | 12/1999 |
| JP | 2000241086 A | 8/2000 |
| JP | 2001027158 | 1/2001 |
| JP | 2002070658 | 3/2002 |
| JP | 2002147292 | 5/2002 |
| JP | 2002-529636 | 9/2002 |
| JP | 2003-90693 | 3/2003 |
| JP | 2005-515360 | 5/2005 |
| JP | 2005-530978 | 10/2005 |
| JP | 2006057475 | 3/2006 |
| JP | 2006-513393 | 4/2006 |
| JP | 2007-510119 | 4/2007 |
| JP | 2007-518913 | 7/2007 |
| WO | WO 2004/065876 A1 | 8/2004 |
| WO | WO 2005/040708 | 5/2005 |
| WO | WO 2005/050118 | 6/2005 |

* cited by examiner

HEAT EXCHANGER, EXHAUST GAS RECIRCULATION SYSTEM, CHARGE AIR SUPPLY SYSTEM, AND USE OF THE HEAT EXCHANGER

This nonprovisional application is a continuation of International Application No. PCT/EP2008/01531, which was filed on Feb. 27, 2008, and which claims priority to German Patent Application No. DE 10 2007 010 134.3, which was filed in Germany on Feb. 28, 2007, and which are both herein incorporated by reference.

BACKGROUND OF THE INVENTION

1. Field of the Invention

The present invention relates to a heat exchanger for heat transfer between a first fluid and a second fluid, comprising: a block for the separate and heat-exchanging guiding of the first and second fluid, and a fluid connection for the first fluid; the block which has a housing with a chamber, through which the second fluid flows, and a block closure element, also called a base, for separating the chamber and the fluid connection, and/or an interior space of the fluid connection. The invention relates further to an exhaust gas recirculation system, a charge air supply system, and use of the heat exchanger for an internal combustion engine of a motor vehicle.

2. Description of the Background Art

Heat exchangers have the task of cooling a hot first fluid with the aid of a colder second fluid, so that the first fluid, particularly an exhaust gas or charge air, can be mixed into the intake air for an internal combustion machine, for example, an engine. The second fluid is usually made as a coolant, which can be removed from the cooling circuit of the internal combustion engine. Basically, to increase the thermodynamic efficiency, the aim is that the cooling occurs to as low a temperature level as possible. It is known that the concept of cooled exhaust gas recirculation or cooled charge air can be used to reduce pollutants, particularly nitrous oxides, in the exhaust gas. Owing to the increased basic requirements for a heat exchanger and the operating mode of modern internal combustion engines, it has turned out that a heat exchanger is exposed increasingly to greater mechanical stresses because of thermal loads. This relates particularly to the area of the fluid connection and of the block closure element, particularly in the area of entry of the first fluid. In this area, the relatively hot first fluid and the cooler second fluid are separated by the block closure element closely adjacent in a relatively narrow space. The stresses caused there by different temperatures in the heat exchanger usually have a direct effect on the lifetime of the heat exchanger.

This problem has proven to be increasingly serious, particularly in modern diesel engines. In addition, however, the problem of thermal stresses within the scope of increased power densities and increased dynamics during engine operation proved to be important in other modernized engine concepts as well, e.g., also in gasoline engines. It turned out that increasing inlet pressures and temperatures with simultaneously increased cooling rates, or temperature differences, are to be sought in a heat exchanger, as limited a pressure drop as possible to be achieved simultaneously. This is to be realized increasingly with relatively inexpensive materials and basically with saving of materials and with consideration of narrower design spaces.

These circumstances intensify the problem of thermally induced stress, particularly at joining seams, primarily in adjacent components of different thickness, as can be the case in the aforementioned fluid connection and the block closure element, as well as the housing. The block closure element is basically used for separating the relatively hot first fluid from the cooler second fluid.

Designs according to the conventional art provide that the fluid connection is fixed to the block closure element. In this type of design, relatively thin guiding channels for the first fluid and relatively thick components, such as the housing and fluid connection, are fixed close together in the area of or on the block closure element. Thus, very different measures have been proposed in designs of this type to reduce the thermally induced stresses in the area of the block closure element. These include structural measures for realizing the block closure element, or if applicable for realizing a unit comprising a block closure element, housing, and fluid connection, as well as highly different types of joining and attachment of the block closure element and the components fixed to the block closure element. Depending on the employed material, welded and/or soldered and/or glued connections are used in this area.

It turned out that the increased requirements for component strength and lifetime of a heat exchanger, exposed to increased thermal stress, cannot always be met in a satisfactory way by designs according to the conventional art. The aforementioned area of the connection of the fluid connection, block closure element, and housing is particularly problematic.

SUMMARY OF THE INVENTION

It is therefore an object of the present invention to provide a heat exchanger, as well as a device and a use, by which mechanical stresses, particularly those caused by thermal loads, are reduced. This is to be made possible particularly also for increased load and operating states of modern engines, particularly diesel engines, and thus result in a longer heat exchanger lifetime.

In regard to the heat exchanger, the object is attained by the invention with a heat exchanger of the aforementioned type, in which according to the invention the housing is provided for connecting the block to the fluid connection.

The invention proceeds from the consideration that a basically sensible fixing of the fluid connection to the block closure element in regard to the problems caused by thermal stresses, particularly in integral joining seams, is not advantageous from every aspect. The invention has recognized that, on the one hand, the fluid connection for the first fluid, and the block closure element for separating the chamber and the fluid connection and/or an interior space of the fluid connection, during operation of a heat exchanger are not only exposed to different temperature levels, but, on the other hand, the fluid connection, the block closure element, and the housing have different material strengths and material qualities based on function. The concept of the invention pursues two basic approaches in an advantageous combination to resolve the aforementioned problem. On the one hand, a connection or fixing of the fluid connection should be spatially separate from a connection or fixing of the block closure element and, on the other, the connection or fixing of said parts should occur on a relatively materially thick part. As a result, on the one hand, the effect is achieved that arising temperature differences are separated from one another as far as possible spatially and, on the other, different heat inputs are exposed to a relatively increased amount of material. In an advantageous combination of these two approaches, the thermal stresses in the area of the connection or fixing of the block closure element and of the fluid connection in the invention are essentially reduced in comparison with heat exchanger designs known from the conventional art. In other words, the concept of the invention is not based on using the block closure element exclusively for connecting the block to the fluid connection, but the housing is used predominantly, especially exclusively, for connecting the block to the fluid connection. Both the housing and the fluid connection are relatively materially thick components, so that an appropriate joining connection between these components can be made not only strengthened, but it also has an increased amount of material to take up high temperature loads and heat inputs with optionally high dynamics. The concept of the invention achieves that thermal expansions of the block closure element and of the fluid connection no longer add up or overlap directly, but rather owing to the connection of the fluid connection to the housing occur spatially separated as far as possible from one another.

The concept of the invention has essentially proven advantageous in heat exchangers with a very different design and suitability. The concept proves to be especially efficient in addition in heat exchangers that assure a fluid-tight separation of the chamber and fluid connection by a block closure element. Such similarly designed or other heat exchangers preferably provide that the block has a number of flow channels, through which the first fluid can flow. Preferably, the housing is used to accommodate the flow channels.

In an embodiment, the block closure element, also called a base, is provided with one or more through openings for flow channels, through which the first fluid can flow. The fluid connection can be fluidically connected to the flow channels. The fluid connection can be formed essentially as a diffuser. The concept of the invention is preferably realized with an inlet diffuser, because the aforementioned problems are especially serious particularly in the first fluid inlet area. In addition, it is also possible, however, to realize the concept of the invention with an outlet diffuser.

The concept is likewise suitable for heat exchangers in which in each case a separate inlet-side and outlet-side block closure element in regard to the first fluid is provided. In addition to or as an alternative, an individual block closure element can have both an inlet area and an outlet area for the first fluid.

The connection of the block to the fluid connection can occur within the scope of an integral connection, such as with a welded connection and/or a soldered connection and/or a glued connection. The diffuser, for example, an inlet diffuser, is relatively hot precisely in modern and highly stressed heat exchanger designs. To this end, it can be advantageous to make the diffuser of metal, particularly of stainless steel. In this regard, the diffuser can be fixedly welded to the housing. A welded connection is can be made as a fusion welded connection, particularly created during a MIG/MAG welding process. A laser welded connection or other types of welded connection are also basically possible.

Particularly in the aforementioned designs, but also in other designs for a heat exchanger not named here, it is especially advantageous according to an embodiment of the invention that the fluid connection, particularly a diffuser, is fixed to an outer surface of the housing and/or the block closure element to an inner surface of the housing. As a result, the fixing points, therefore the location of a welded seam and/or the location of a soldered seam, are spaced apart at least by the housing wall, so that the greatest temperature differences for generating thermally induced mechanical stresses do not occur directly at the block closure element, but rather in advantageous manner are borne by the materially thick housing and separated spatially. It is especially preferred to fix the fluid connection only to the outer surface of the housing and/or to fix the block closure element only to the inner surface of the housing. The type of fixing, as explained, relates especially preferably to a welded connection and/or a soldered connection and/or a glued connection, but advantageously can also relate to other integral types of fixing and optionally also to non-integral types of fixing.

According to another embodiment of the invention, it is provided that the block closure element can be fixed at a second point on the housing and the fluid connection is fixed at a first point on the housing, the first point and the second point being spaced apart along a longitudinal extension of the housing, i.e., usually in the direction of flow of the first fluid. This has the advantage that the fixing points of the block closure element and of the fluid connection, therefore, for example, two welded seams, are separated from one another not only by the housing wall but, moreover, can also be separated by a longitudinal distance which again can be designed larger. Preferably, the second point is closer to the end of the housing than the first point. In other words, preferably the fluid connection is slipped over the housing.

Further, the slipped-over area of the heat exchanger can be refined advantageously. Thus, a first and a second point can be arranged farther from one another than a thickness of a block closure element in the longitudinal extension. The distance of the first and second point can also be greater than the end section of the flow channels. This leads to a virtually complete decoupling of the joining point of the fluid connection to the housing, on the one side, from an especially delicate area stressed by high thermal stresses of the connection of the block closure element to the housing, on the other. In other words, within the scope of this and other refinements, a fixing area, within which the block closure element and the fluid connection are fixed, extends from an end of the housing along a longitudinal extension of the housing in the direction of flow of the first fluid. The fixing area can extend at least beyond the second point.

According to another embodiment of the invention, a wall thickness of the housing in the fixing area can be made thicker than a wall thickness in an area adjacent to the fixing area. In addition or alternatively, the housing can be reinforced in the fixing area. In addition or alternatively, the housing can have thermal compensator in the fixing area, such as, for example, channels, fins, or other means for effective heat removal and relief during thermal stress. Also suitable are beads, grooves, folds, or other areas for compensating for expansions and/or stresses.

A wall of the housing can be curved from the fixing area to the adjacent area in the longitudinal extension. The housing can also be tapered from the fixing area to the adjacent area. It turned out that this structural embodiment of the fixing area enables an especially effective matching of the housing to thermally induced positional changes.

A flow channel, for the first fluid, can be essentially formed in a different way. The concept of the invention is especially preferably suitable for a heat exchanger with a flow channel for the first fluid, which is made in the shape of the tube. The concept of the invention, however, can also be used in a heat exchanger in which a flow channel, preferably for the first fluid, is made in the shape of plates joined one on top of another. These and other flow channels can advantageously have a heat-conducting member, particularly in form of a fin, preferably in form of an inner fin attached to an inner channel surface and/or in form of an outer fin attached to an outer channel surface. A heat exchanger to improve the heat transfer between the first fluid and the second fluid can also have a flow guidance device, particularly a turbulence device, which usually facilitates improved fluid convection.

The concept of the invention has proven especially valuable in a heat exchanger in the form of an exhaust gas heat exchanger, particularly an exhaust gas cooler. Similarly, the concept of the invention, in addition, can also be used for a heat exchanger in the form of a direct or indirect charge air heat exchanger, particularly a charge air cooler.

The invention, in relation to the device, also leads to an exhaust gas recirculation system for an internal combustion engine, having exhaust gas recirculation, a compressor, and a heat exchanger of the type described heretofore, according to the concept of the invention, in the form of an exhaust gas heat exchanger, particularly an exhaust gas cooler.

Further, the invention leads to a charge air supply system for an internal combustion engine, having a charge air intake, an air filter, a compressor, and a heat exchanger of the type described heretofore, according to the concept of the invention, in the form of a charge air heat exchanger, particularly a charge air cooler.

In regard to use, the concept of the invention has proven advantageous for use of the heat exchanger for an internal combustion engine in the form of a diesel engine of a motor vehicle, particularly in the form of a heavy-duty utility vehicle.

Overall, because of the structural separation from the fluid connection and block closure element by the housing, the concept of the invention results in a longer heat exchanger lifetime and generally leads to a higher load limit in comparison with heat exchanger designs according to the conventional art. Thereby, other fields of application for a heat exchanger can be opened or greater customer requirements can be met.

Exemplary embodiments of the invention will now be described hereinafter using the drawing in comparison with the conventional art, which is also shown in part. It should depict the exemplary embodiments but not necessarily to scale; rather the drawing, where helpful for the explanation, is realized in schematicized and/or slightly distorted form. In regard to additions to the teaching discernible directly from the drawing, reference is made to the relevant conventional art. It must be taken into account here that numerous modifications and changes in regard to the form and detail of an embodiment may be made, without departing from the general idea of the invention. The features of the invention disclosed in the description, in the drawing, and in the claims both individually and in any combination can be essential for the refinement of the invention. In addition, all combinations of at least two features disclosed in the description, the drawing, and/or the claims fall within the scope of the invention. The general idea of the invention is not limited to the precise form or the detail of the preferred embodiment shown and described hereinafter or limited to a subject matter that would be limited in comparison with the subject matter claimed in the claims. In the case of the indicated dimensioning ranges, values also within the indicated limits are to be disclosed as limit values and can be used and claimed as desired.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
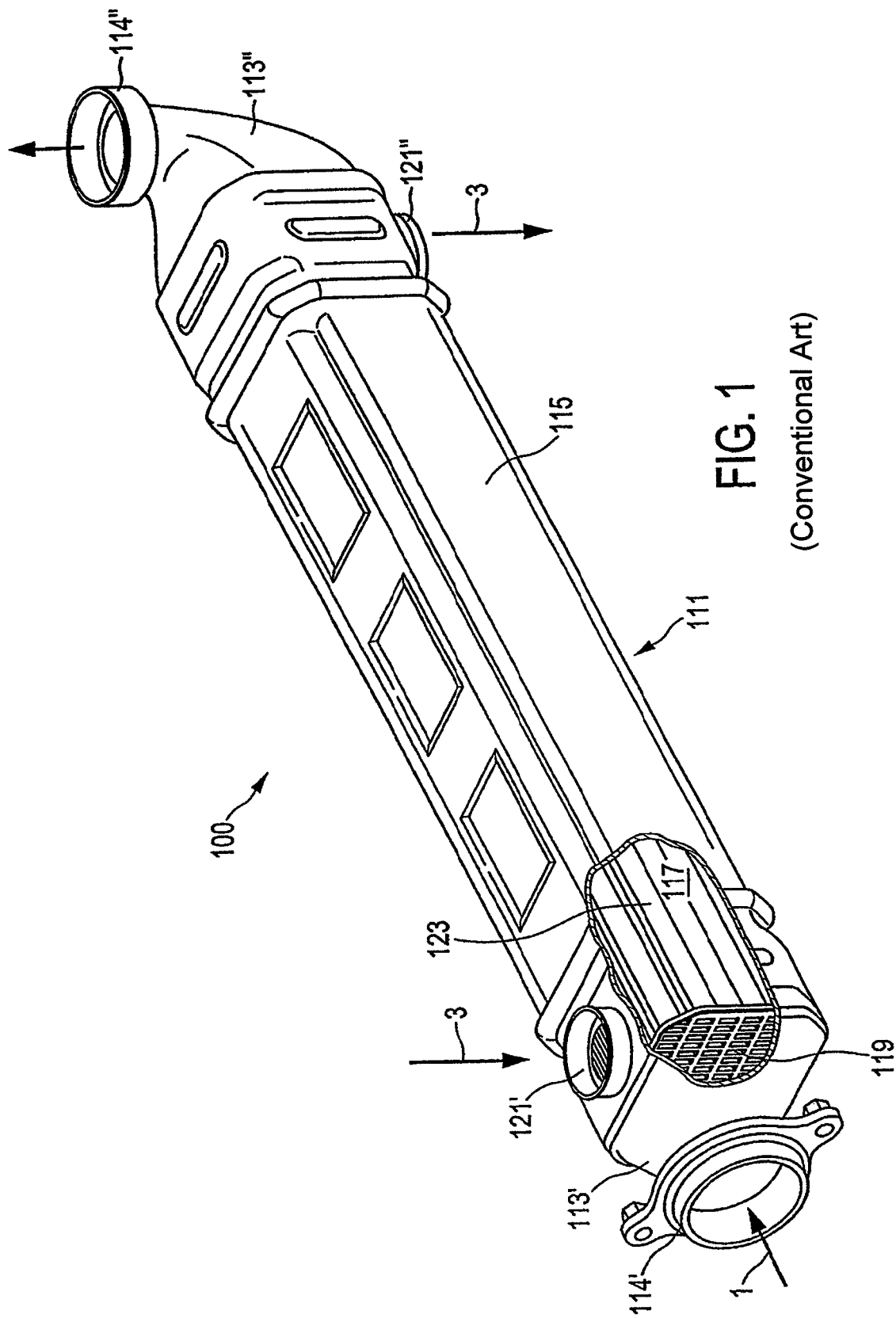
FIG. 1 is a perspective sectional view of a heat exchanger according to the conventional art.
Figure 2:
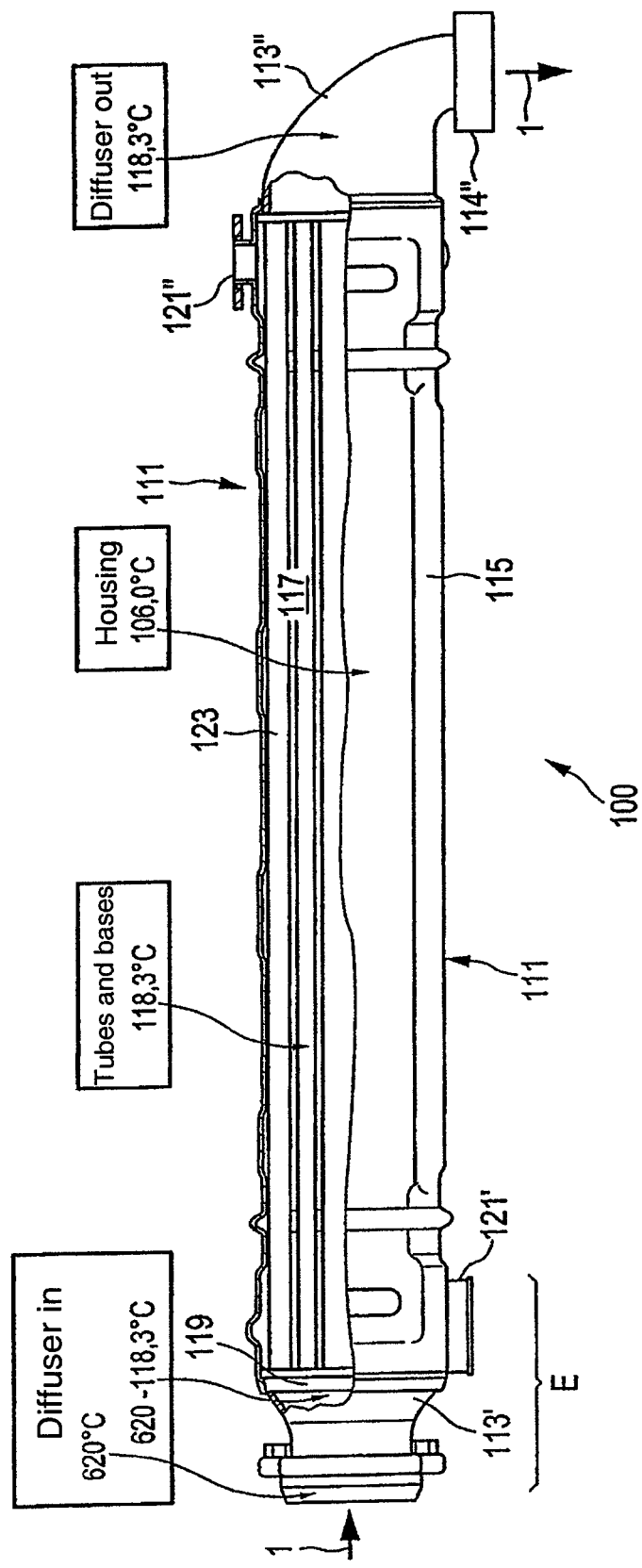
FIG. 2 is a partial section/side view with a temperature profile of the heat exchanger of FIG. 1.

FIG. 1 and FIG. 2 show, for an overview, a heat exchanger 100 according to the conventional art in the form of an exhaust gas heat exchanger for heat transfer between a first fluid 1 in the form of an exhaust gas and a second fluid 3 in the form of a coolant. To this end, heat exchanger 100 has a block 111 for the separate and heat-exchanging guiding of first fluid 1 and second fluid 3, as well as fluid connection 113 for first fluid 1. In the present case, a fluid connection 113 is formed, on the one side, as an inlet diffuser 113' or, on the other side, as an outlet diffuser 113", which can be connected in each case via a flange 114', 114" to the periphery of an exhaust gas recirculation system, not shown in greater detail. Block 111 has a housing 115 with a chamber 117, through which second fluid 3 can flow, and a block closure element 119 for fluid-tight separation of chamber 117 and an interior space of fluid connection 113. Housing 115 to this end accommodates in chamber 117 flow channels 123 through which first fluid 1 can flow and over which fluid connection 113 is fed. Block closure element 119 in the form of a base is therefore used for the fluid-tight separation of first fluid 1 in fluid connection 113 and flow channels 123, as well as second fluid 3 in chamber 117. The second fluid is supplied to chamber 117 or removed from chamber 117, respectively, via corresponding connecting pieces, namely, an inlet connecting piece 121' and an outlet connecting piece 121".

FIG. 2 clarifies the mechanical stress problem occurring due to extensive temperature differences during operation of a heat exchanger 100, particularly in the case of a fluid connection 113 formed as an inlet diffuser 113'. As is evident directly from the temperature data in FIG. 2, the greatest temperature gradient occurs during operation of heat exchanger 100 within a relatively short entry area E; said gradient within the scope of the modern use, depicted here, of heat exchanger 100 typically covers a temperature range between approximately 620° C. and approximately 120° C., if necessary also beyond said range. This results from the immediate proximity of an inlet diffuser 113', exposed to hot exhaust gas, on the one hand, which is typically at temperatures in the range of 620° C., and inlet connecting piece 121' for a second fluid 2, on the other, which results in heating of the inner surface of chamber 117 in the inlet-side area E at about 120° C. The area of the longitudinal extension of heat exchanger 100, said area which is shown to the right of inlet-side area E in FIG. 2, is exposed to a relatively low temperature gradient, which covers temperatures between 120° C. and 100° C. in the embodiment depicted here, so that in particular at outlet diffuser 113" the aforementioned problems are not as serious as in the case of inlet diffuser 113'.

In the present case, as is evident from FIG. 2, according to the conventional art, inlet diffuser 113' is fixed at block closure element 119 in the form of a base, said base which in turn holds flow channels 123 and is fixed on the inner surface of housing 115. According to the embodiment, shown in FIG. 2, of a heat exchanger 100 according to the conventional art, block closure element 119 in the form of a base is therefore used for connecting block 111 to fluid connection 113 in the form of inlet diffuser 113'. Block closure element 119 is therefore exposed to relatively high mechanical stress due to the temperature gradient predominating in inlet area E. This circumstance is a direct lifetime-limiting factor for a heat exchanger 100 according to FIG. 1 and FIG. 2.

Figure 3:
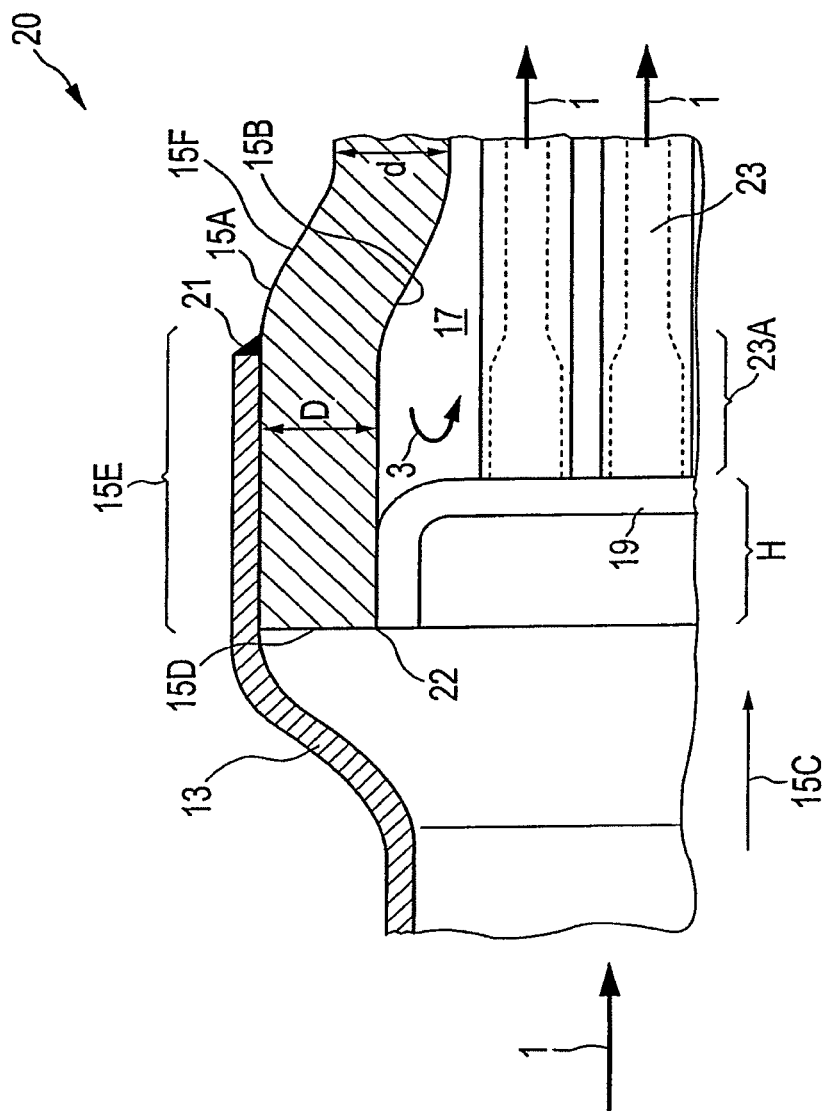
FIG. 3 is a sectional view of a detail of the fixing area of the housing, block closure element, and fluid connection a heat exchanger according to an embodiment of the invention.
Figure 4:
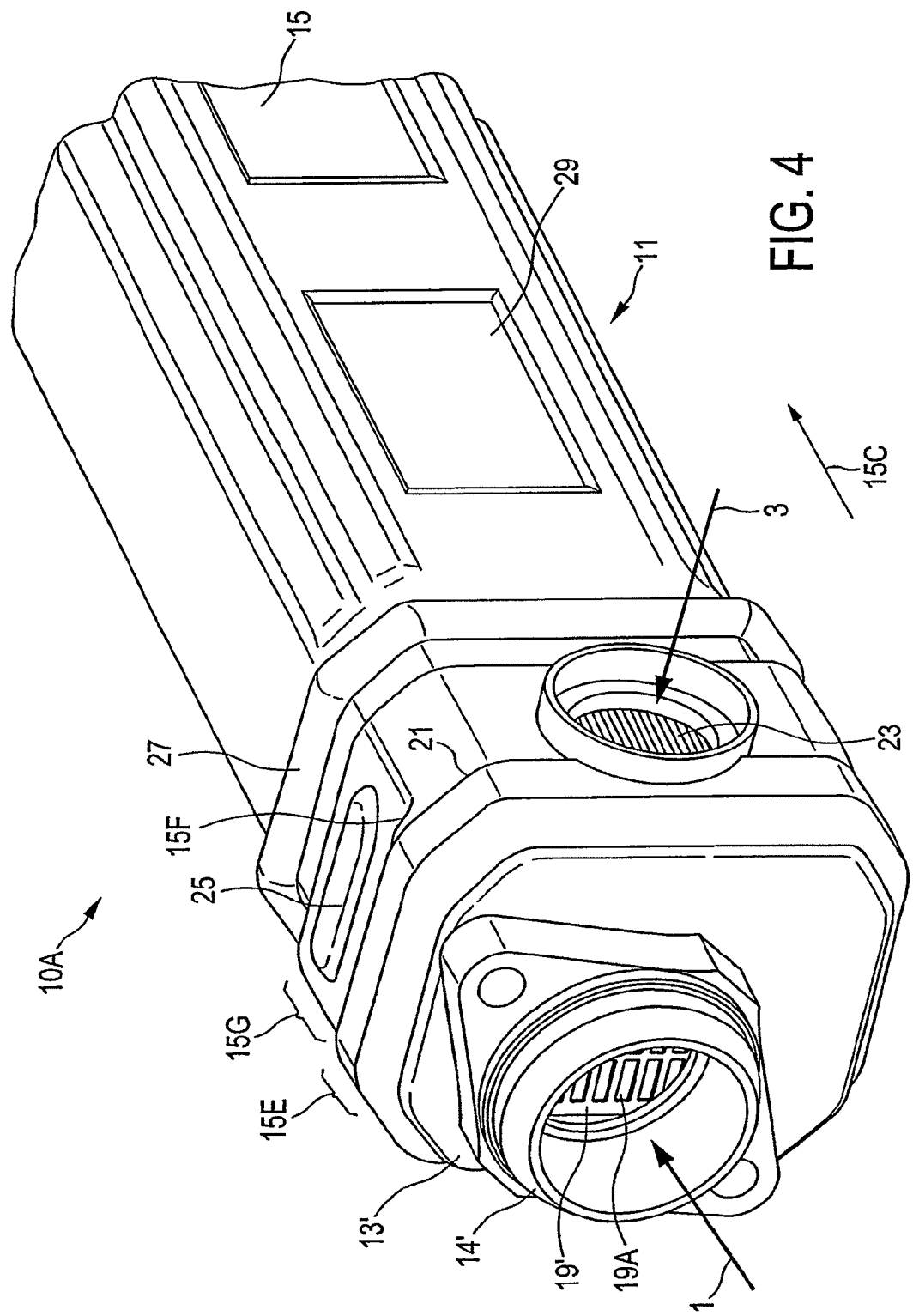
FIG. 4 is a perspective partial view of a first exemplary embodiment of a heat exchanger according to the detail in FIG. 3.

FIG. 3 shows a fixing area 20 for a heat exchanger 10A, shown in greater detail in FIG. 4, according to an especially preferred embodiment in the form of an exhaust gas cooler, which is provided for heat transfer between a first fluid 1, formed as an exhaust gas, and a second fluid 3, formed as a water-based coolant. Heat exchanger 10A has a block 11, shown further in FIG. 4, for the separate and heat-exchanging guiding of first fluid 1 and second fluid 3, as well as a fluid connection 13 for first fluid 1, which in the present case is formed as a diffuser. Block 11 has a housing 15, shown further in FIG. 4, and a chamber 17, through which second fluid 3 flows, and a block closure element 19, in the present case in the form of a base, which is used for the fluid-tight separation of chamber 17 and fluid connection 13. In this embodiment, in the present case, fluid connection 13, formed as a diffuser, is fixed only to an outer surface 15A of housing 15.

Block closure element 19, in the present case in the form of a base, is fixed only to the inside surface 15B of housing 15. The diffuser in the present case is fixed by a welded seam, here a MIG/MAG welded seam, at a first point 21 on the outer surface 15A of housing 15 and the base is fixed at a second point 22 on the inner surface 15B of housing 15 by a welded seam, here a laser welded seam. In this preferred embodiment, first point 21 and second point 22 are spaced apart along a longitudinal extension 15C of housing 15, which is determined substantially by the direction of flow of first fluid 1. In the present case, second point 22 is formed virtually at the end 15D of housing 15, whereas first point 21 is formed at a distance from end 15D of housing 15. In addition, in this embodiment, fixing area 15E of housing 15 is made with a thicker wall thickness D than another wall thickness d of housing 15 in the other adjacent area, which is adjacent to the other side of fixing area 15E and is shown in FIG. 4. The wall of housing 15, moreover, is provided with a curve 15F from fixing area 15E toward the adjacent area, so that overall as evident in FIG. 4, housing 15 tapers from fixing area 15E toward an adjacent area 15G in the direction of the longitudinal extension 15C of housing 15.

Figure 6:
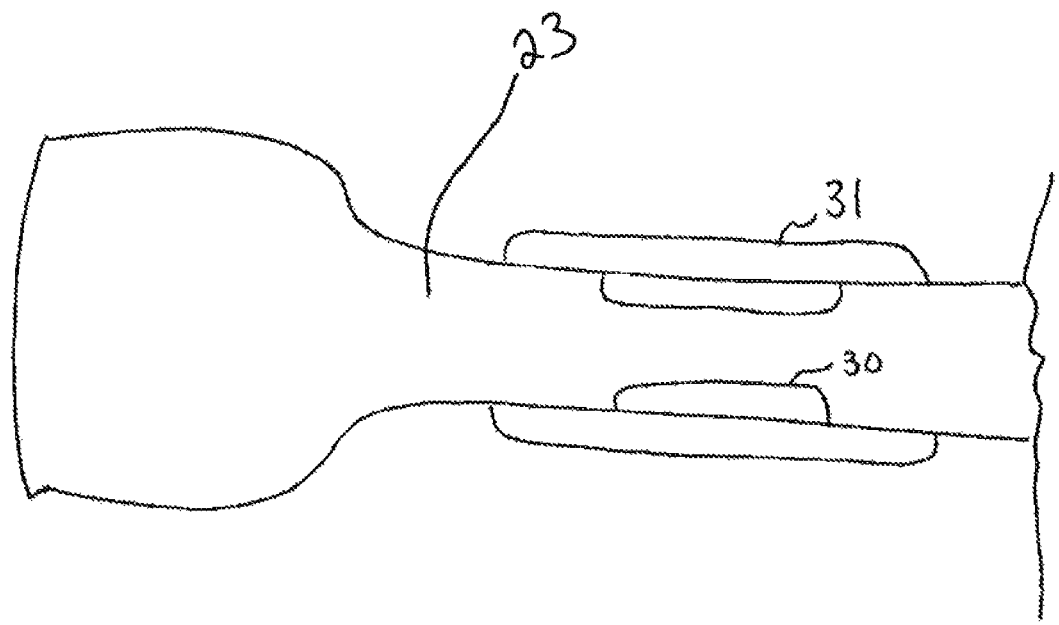
FIG. 6 is a sectional view of a flow channel having an inner fin and an outer fin.

Flow channels 23 for first fluid 1 in the present case are formed as heat exchange tubes. A heat exchange tube has an end section 23A, which is inserted in a through opening 19A, shown in greater detail in FIG. 4, in the base. Block closure element 19 in the form of the base to this end has a corresponding profiling of the height H. In the present embodiment, therefore, it is realized in addition that first point 21 and second point 22 are separated from one another so far that the distance between the two points 21, 22 exceeds the height H of block closure element 19, end section 23A of the heat exchange tube, and their sum. As a result, an especially preferred decoupling of heat inputs is achieved, which have an effect, on the one hand, in the area of the base on the inner surface 15B of housing 15 and, on the other, on the outer surface 15A of housing 15. The integral joining connection, made at first point 21, in the form of a MIG/MAG welded connected is removed relatively far from the laser welded connection at second point 22 and, moreover, in the present embodiment, the base as such is not stressed in addition with a welded connection for fluid connection 13 in the form of the diffuser. Furthermore, as shown in FIG. 6, at least one of the flow channels 23 has a heat conducting member in the form of a fin or in the form of an inner fin 30 attached to an inner surface of the channel 23 and/or in the form of an outer fin 31 attached to an outer surface of the channel 23.

As already described in part using FIG. 3, FIG. 4 shows a first embodiment of a heat exchanger 10A according to the invention, in the inlet-side area E. The block closure element in the present case is formed as an inlet-side base 19'. The fluid connection in the form of an inlet diffuser 13' is slipped over housing 15, namely, housing 15 and inlet diffuser 13' overlap in a fixing area 15E described heretofore. The adjacent curve 15F tapers the housing toward an adjacent area 15G. In the embodiment, shown in FIG. 4, of a heat exchanger 10A, housing 15 in the adjacent area 15G, in the area of the curve 15F, and in the fixing area 15E is made with a thickened wall thickness D, shown in greater detail in FIG. 3. This is made clearer in FIG. 4 by the moderate shading in contrast to the other housing 15. Inlet diffuser 13' is connected by means of a flange 14' to a periphery of an exhaust gas recirculation system, not shown in greater detail.

Figure 5:
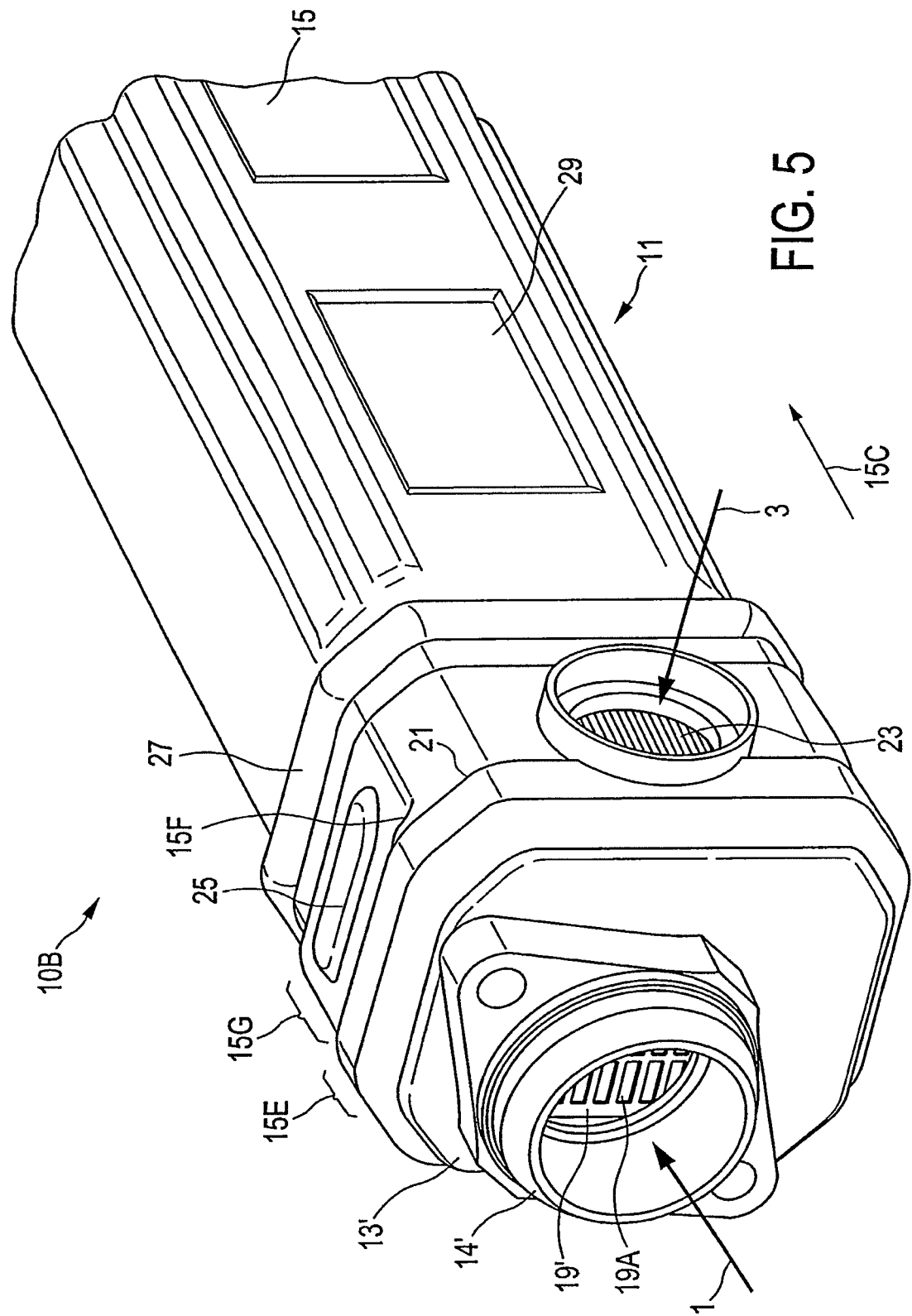
FIG. 5 is a perspective partial view of a second exemplary embodiment of a heat exchanger.

In FIG. 5, another also advantageous embodiment of a heat exchanger 10B is shown, which, otherwise as depicted in FIG. 4 und FIG. 3, has no additional thickening of the wall thickness of housing 15 in adjacent area 15G in the area of curve 15F and fixing area 15E. The embodiment of a heat exchanger 10B in FIG. 5 utilizes the thickness of housing 15, said thickness which is made considerably thicker than the inlet-side base 19', to slip over inlet diffuser 13', similar to FIG. 3 and FIG. 4, and to fix it at first point 21 with a welded seam.

Housings 15 in FIG. 4 und FIG. 5 each have a protuberance 25 and bulge 27 as additional thermal compensator, which are capable of compensating for thermal positional changes and/or dimensional changes of housing 15 relative to inlet diffuser 13' and thus relieve the welded connection at first point 21 and another welded connection at second point 22, shown in FIG. 3, in regard to thermally induced stresses. Housing 15, in addition, has beads 29, which are used for reinforcement.

The measures in the present case, described in regard to an inlet-side area E, can also be realized in the area of outlet-side base 19'', not shown in greater detail, in an embodiment, not shown in greater detail, alone or in combination with the aforementioned features.

Figure 7:
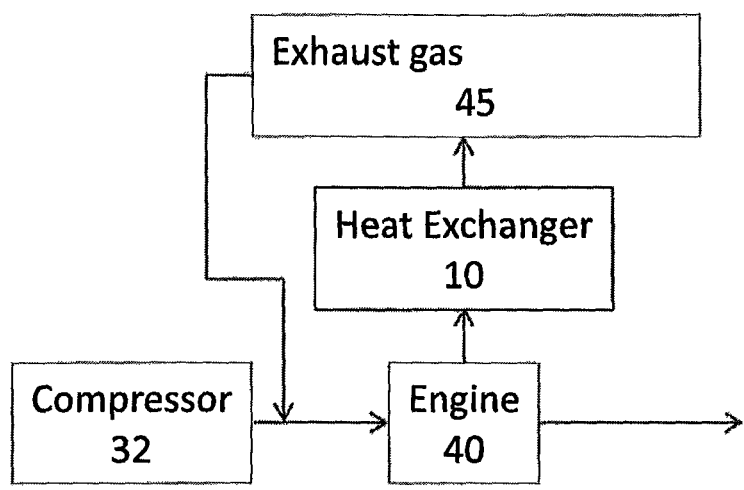
FIG. 7 is a diagram of an exhaust gas recirculation system according to the present invention.
Figure 8:
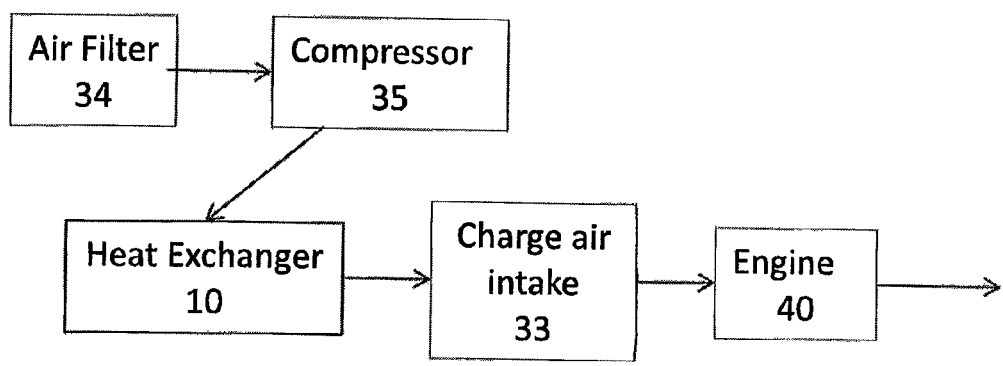
FIG. 8 is a diagram of a charge air supply system according to the present invention.

As shown in FIG. 7, the invention also leads to an exhaust gas recirculation system for an internal combustion engine 40, having exhaust gas recirculation 45, a compressor 32, and a heat exchanger 10 of the type described heretofore, according to the concept of the invention, in the form of an exhaust gas heat exchanger, particularly an exhaust gas cooler. Further, as shown in FIG. 8, the invention leads to a charge air supply system for an internal combustion engine 40, having a charge air intake 33, an air filter 34, a compressor 35, and a heat exchanger 10 of the type described heretofore, according to the concept of the invention, in the form of a charge air heat exchanger, particularly a charge air cooler.

In summary, the invention relates to a heat exchanger 10, particularly an exhaust gas heat exchanger or charge air heat exchanger, for heat transfer between a first fluid 1, particularly an exhaust gas or charge air, and a second fluid 3, particularly a coolant, comprising: a block 11 of separate and heat-exchanging guiding of the first [fluid] 1 and second fluid 3, and a fluid connection 13 for first fluid 1; said block 11 which has a housing 15 with a chamber 17 through which second fluid 3 flows, and a block closure element 19 for preferably fluid-tight separation of chamber 17 and fluid connection 13. According to the concept of the invention, housing 15 is provided for connecting block 11 to fluid connection 13. The concept in particular provides that block closure element 19 is not provided for connection of block 11 to fluid connection 13, but preferably only housing 15. As a result, thermal stresses in the area of the block connection are advantageously avoided. Preferably, housing 15 in the area of the block connection can be thickened appropriately. Preferably, also the fixing site for block closure element 19 on housing 15 and the fixing site for fluid connection 13 on housing 15 are spaced apart.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A heat exchanger for heat transfer between a first fluid and a second fluid, the heat exchanger comprising:
    a fluid connector provided for the first fluid; and
    a block for separate and heat-exchanging guiding of the first and second fluid; the block comprising:
        a housing having a chamber configured such that the second fluid flows therethrough; and
        a block closure element configured for fluid-tight separation of the chamber and the fluid connector, the housing being configured to connect the block closure element to the fluid connector,
    wherein a wall thickness of the housing in a fixing area where the fluid connector is fixed to the housing is thicker than a wall thickness in an area adjacent to the fixing area.

2. The heat exchanger according to claim 1, wherein the block has a plurality of flow channels configured such that the first fluid flows therethrough.

3. The heat exchanger according to claim 2, wherein the housing accommodates the flow channels.

4. The heat exchanger according to claim 2, wherein the fluid connector is fluidically connected to the plurality of flow channels.

5. The heat exchanger according to claim 2, wherein at least one of the flow channels for the first fluid is configured as a tube.

6. The heat exchanger according to claim 2, wherein at least one of the flow channels for the first fluid is configured as plates joined one on top of another.

7. The heat exchanger according to claim 2 wherein at least one of the flow channels has a heat-conducting member in the form of a fin or in the form of an inner fin attached to a channel inner surface and/or in the form of an outer fin attached to the channel outer surface.

8. The heat exchanger according to claim 1, wherein the block closure element, which is configurable in the form of a base, is provided with one or more through openings for flow channels that are configured such that the first fluid flows therethrough.

9. The heat exchanger according to claim 1, further comprising a separate inlet-side block closure element and an outlet-side block closure element with respect to the first fluid and/or the block closure element that has an inlet area and an outlet area for the first fluid.

10. The heat exchanger according to claim 1, wherein the fluid connector is configured as a diffuser, an inlet diffuser, or outlet diffuser.

11. The heat exchanger according to claim 1, wherein the fluid connector is fixable to an outer surface of the housing and/or wherein the block closure element is fixable to an inner surface of the housing.

12. The heat exchanger according to claim 1, wherein the fluid connector is fixed only to an outer surface of the housing.

13. The heat exchanger according to claim 1, wherein the block closure element is fixed only to an inner surface of the housing.

14. The heat exchanger according to claim 1, wherein the block closure element is fixed at a second point of the housing and the fluid connector is fixed at a first point of the housing, wherein the first point and the second point are spaced apart along a longitudinal extension of the housing, and wherein the second point is closer to an end of the housing than the first point.

15. The heat exchanger according to claim 14, wherein the first and the second point are spaced farther apart than a thickness of the block closure element in the longitudinal extension or than an end section of flow channels.

16. The heat exchanger according to claim 1, wherein the housing is reinforced in the fixing area, or wherein the housing has a thermal compensator.

17. The heat exchanger according to claim 1, wherein a wall of the housing is curved from the fixing area toward an adjacent area in a longitudinal extension, or wherein the housing tapers from the fixing area to the adjacent area.

18. The heat exchanger according to claim 1, wherein the block closure element and/or the fluid connection are fixable via an integral joining connection to the housing.

19. The heat exchanger according to claim 18, wherein the integral joining connection is a soldered connection, a welded connection, a MIG/MAG welded connection, a laser welded connection, and/or glued connection.

20. The heat exchanger according to claim 1, further comprising a flow guidance device or a turbulence device.

21. The heat exchanger according to claim 1, wherein the heat exchanger is an exhaust gas heat exchanger or an exhaust gas cooler.

22. The heat exchanger according to claim 1, wherein the heat exchanger is a direct or indirect charge air heat exchanger or a charge air cooler.

23. The heat exchanger according to claim 1 is used in an internal combustion engine in a motor vehicle, wherein the internal combustion engine is a diesel engine or wherein the motor vehicle is a heavy-duty utility vehicle.

24. The heat exchanger according to claim 1, wherein the first fluid is an exhaust gas or charge air and wherein the second fluid is a coolant.

25. The heat exchanger according to claim 1, wherein the block closure element is a base member having one or more through openings and wherein end portions of one or more flow channels, through which the first fluid flows, are inserted through the one or more through openings, respectively.

26. An exhaust gas recirculation system for an internal combustion engine, the system comprising:
    an exhaust gas recirculation;
    a compressor; and
    a heat exchanger configured as an exhaust gas heat exchanger or an exhaust gas cooler, the heat exchanger comprising:
        a fluid connector provided for the first fluid; and
        a block for separate and heat-exchanging guiding of the first and second fluid; the block comprising:
            a housing having a chamber configured such that the second fluid flows therethrough; and a block closure element configured for fluid-tight separation of the chamber and the fluid connector, the housing being configured to connect the block closure element to the fluid connector, wherein a wall thickness of the housing in a fixing area where the fluid connector is fixed to the housing is thicker than a wall thickness in an area adjacent to the fixing area.

27. A charge air supply system for an internal combustion engine, comprising:

a charge air intake;
an air filter;
one or more compressors; and
a heat exchanger configured as a charge air heat exchanger or a charge air cooler, the heat exchanger comprising:
  a fluid connector provided for the first fluid; and
  a block for separate and heat-exchanging guiding of the first and second fluid; the block comprising:
    a housing having a chamber configured such that the second fluid flows therethrough; and
    a block closure element configured for fluid-tight separation of the chamber and the fluid connector, the housing being configured to connect the block closure element to the fluid connector,
wherein a wall thickness of the housing in a fixing area where the fluid connector is fixed to the housing is thicker than a wall thickness in an area adjacent to the fixing area.

* * * * *